United States Patent Office 3,369,038
Patented Feb. 13, 1968

3,369,038
CAROTENOID DYES
Teunis Kralt and Hans Heinz Haeck, Van Houtenlaan, Weesp, Netherlands, assignors to North American Philips Company Inc., New York, N.Y., a corporation of Delaware
No Drawing. Filed Apr. 8, 1965, Ser. No. 446,712
Claims priority, application Netherlands, Apr. 29, 1964, 64—4,719
5 Claims. (Cl. 260—464)

---

ABSTRACT OF THE DISCLOSURE

Foodstuff dyes of the formula

A—CH=CH—B wherein A and B are moieties of the formula

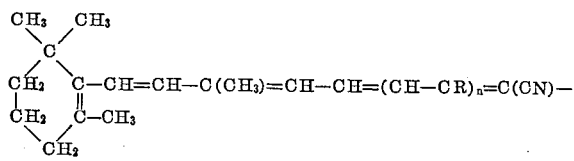

wherein $n$ is 0–3 and R is hydrogen or methyl.

---

The invention relates to new cartotenoid compounds of the formula

A—CH=CH—B wherein A and B are each moieties of the formula:

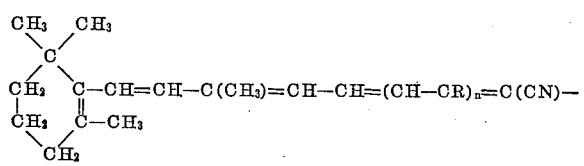

wherein $n$ is 0–3 and R is hydrogen or methyl in which formula R is a hydrogen atom or a methyl group and $n=0$, 1, 2 or 3.

It was found that these compounds are particularly good dyes, and it was found in addition that the compounds according to the invention, compared with corresponding carotenoid compounds without cyano substitution, show a strong shift in the light absorption towards higher wave-lengths.

It has been found, for example, that the compound of the formula

A—CH=CH—B wherein both A and B are moieties of the formula:

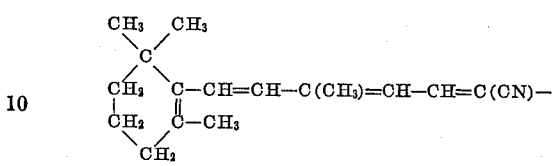

having a chain length of 14 carbon atoms between the two cyclohexene rings, has the same color as carotene having a chain length of 18 carbon atoms. The compound of the formula

A—CH=CH—B wherein both A and B are moieties of the formula:

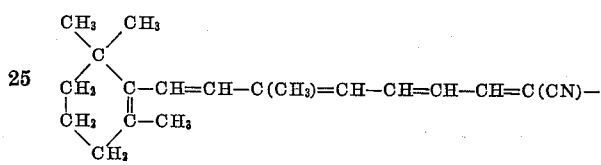

having the same chain length as carotene, has a cherry-red color. By preparing compounds having a longer chain length, dyes are obtained with colors as they have not yet been found so far in single cartoenoid compounds. The compound of the formula

A—CH=CH—B wherein both A and B are moieties of the formula:

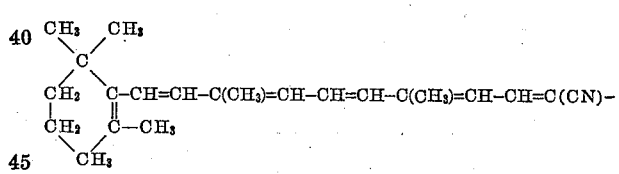

has a violet-red color, while the compound of the formula

A—CH=CH—B wherein both A and B are moieties of the formula:

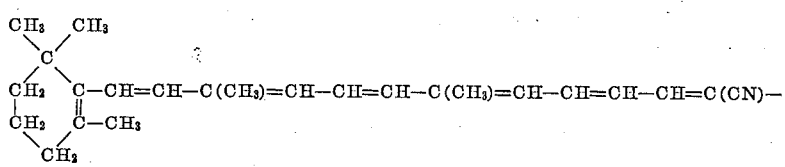

is blue-violet.

The compounds according to the invention which have a stability which is very good for carotenoid compounds, may be used as dyes for foodstuffs. In addition, these new compounds may be used as intermediate products for the preparation of other valuable carotenoid compounds. For example, the above shown compound having a chain length of 14 carbon atoms between the two cyclohexene rings may be used in those cases in which so far β-carotene has been used as the dye. In this case the compound according to the invention has the important advantage of being far more stable chemically than β-carotene, in particular with respect to oxidation by atmospheric oxygen.

The new compounds according to the invention can be prepared by methods which are known per se for the preparation of this type of compounds and by methods analogous thereto. This new class of cartenoid dyes may be produced in a very simple manner and with a high yield by coupling 1 mol of 1,4-dicyanobutene-2 with 2 mols of the appropriate imine or aldehyde in the manner shown in the specific examples. This coupling reaction may be carried out under the circumstances known for condensation reactions of compounds which contain a reactive methylene group with carbonyl compounds and with imines, preferably in a solvent, and in the case of a carbonyl compound, in the presence of a catalyst such as an alkoxide, an alkali amide or an alkali hydride.

Very good results were obtained when using ethanol as the solvent and sodium ethanolate as the condensation agent.

In order that the invention may readily be carried into effect it will now be described in greater detail with reference to the ensuing specific examples.

*Example 1*

1,14 - bis(2',2',6'-trimethylcyclohexen-1'-y1-1')-3,12-dimethyl-6,9-dicyano-tetradecaheptene-1,3,5,7,9,11,13.

6.54 g. of 5(2',2',6'-trimethylcyclohexen-1'-y1-1')-3-methylpentadien-2,4-al-1 (β 15 aldehyde) and 1.59 g. of 1,4-dicyanobutene-2 were dissolved in 40 ml. of absolute ethanol, while heating.

This solution was cooled to 10° C., after which a solution of sodium ethanolate, prepared from 0.69 g. of sodium and 15 ml. of absolute ethanol, was added. The temperature of the reaction mixture was increased to approximately 40° C. while a crystalline substance was formed. After standing at 0° C. for 18 hours, this substance was filtered off, washed with ethanol and dried. Yield 6.9 g., melting point 205° C., after recrystallization from benzene 206–207° C.

$E_{1cm.}^{1\%}$ at $\lambda_{max}=445m\,\mu$ in isooctane=1915.

*Example 2*

1,18 - (2',2',6' - trimethylcyclohexen-1'-y1-1')-3,16-dimethyl - 8,11 - dicyano - octadecanonene - 1,3,5,7,9,11,13,15,17.

By condensing, in the manner described in Example 1 $C_{17}$ aldehyde, 7-(2',2',6'-trimethylcyclohexen-1'-y1-1')-5-methylheptatrien-2,4,6-al-1—a substance which was obtained by oxidation with manganese dioxide of the corresponding alcohol, obtained by reduction with LiAlH$_4$ of the corresponding acid—with 1,4-dicyanobutene-2, the above compound was obtained in a yield of 86%. Melting point 218° C.

$E_{1cm.}^{1\%}$ at $\lambda_{max}=475$ m$\mu$ in isooctane=2330.

*Example 3*

1,22 - (2',2',6' - trimethylcyclohexen-1'-y1-1') - 3,7,16,20 - tetramethyl-10,13-dicyano-docosadecene-1,3,5,7,9,11,13,15,17,19,21.

In the manner described in Example 1 retinal was condensed with 1,4-dicyanobutene-2, the above compound being obtained in a yield of 95%. Melting point 260° C.

$E_{1cm.}^{1\%}$ at $\lambda_{max}=539\,\mu$ in chloroform=2210.

*Example 4*

1,26 - (2',2',6'-trimethylcyclohexen-1'-y1-1')-3,7,20,24 - tetramethyl-12,15-dicyano-hexacosatridecene-1,3,5,7,9,11,13,15,17,19,21,23,25.

In the manner described in Example 1, $C_{22}$ aldehyde: 11 - (2',2',6'-trimethylcyclohexen-1'-y1-1')-5,9-dimethyl-dodecapenten-2,4,6,8,10-al-1 was condensed with 1,4-dicyanobutene-2 to produce the above-designated compound. Yield 95%. Melting point 223° C.

$E_{1cm.}^{1\%}$ at $\lambda_{max}=565\,\mu$ in chloroform 2350.

What is claimed is:
1. A compound of the formula:

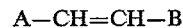

wherein A and B are each moieties of the formula:

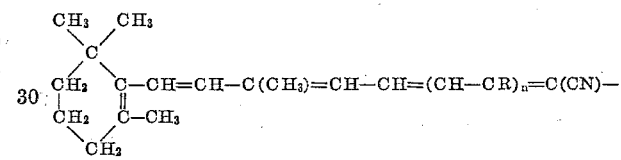

wherein R is selected from the group consisting of hydrogen and methyl and $n$ is an integer from 0 to 3 inclusive.

2. A compound of the formula:

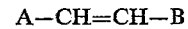

wherein both A and B are moieties of the formula:

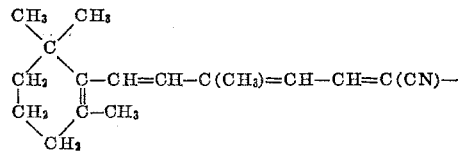

3. A compound of the formula:

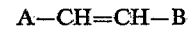

wherein both A and B are moieties of the formula:

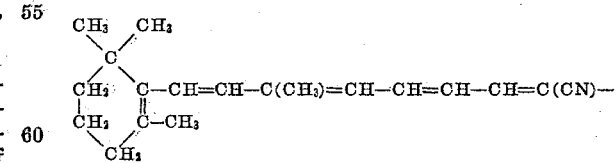

4. A compound of the formula:

wherein both A and B are moieties of the formula:

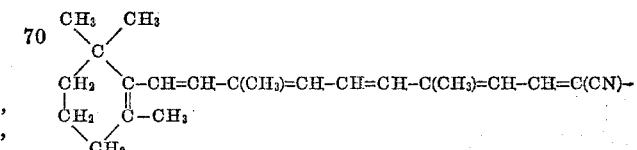

5. A compound of the formula:
A—CH=CH—B
wherein both A and B are moieties of the formula:
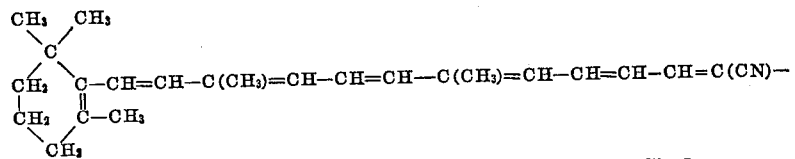
References Cited
UNITED STATES PATENTS
2,369,158    2/1945    Milas _____ 260—464 X
JOSEPH P. BRUST, Primary Examiner.